United States Patent [19]

Hampton, III et al.

[11] Patent Number: 5,749,605
[45] Date of Patent: May 12, 1998

[54] ELECTRICALLY INSULATIVE THREADED CONNECTION

[75] Inventors: John T. Hampton, III; William F. Trainor, both of Houston; Thomas R. Bandy, Katy, all of Tex.

[73] Assignee: Protechnics International, Inc., Houston, Tex.

[21] Appl. No.: 618,283

[22] Filed: Mar. 18, 1996

[51] Int. Cl.$^6$ ..................................................... F16L 11/12
[52] U.S. Cl. ............................ 285/48; 285/53; 285/333
[58] Field of Search .................................. 285/48, 50, 51, 285/52, 53, 54, 333, 334, 355, 390

[56] References Cited

U.S. PATENT DOCUMENTS 3,162,806  12/1964  Voetter .............................. 285/48 X
4,674,773  6/1987  Stone et al. ........................ 285/48

FOREIGN PATENT DOCUMENTS 2348132  3/1975  Germany ............................ 285/53
2296093  12/1990  Japan ................................. 285/53
6109173  4/1994  Japan ................................. 285/48
2222442  3/1990  United Kingdom .................. 285/48

*Primary Examiner*—Dave W. Arola
*Attorney, Agent, or Firm*—Baker & Botts, L.L.P.

[57] ABSTRACT

An insulative threaded connection is provided for metal tubulars to be placed in wells or for other metal pipe. The connection contains a coating of plastic having a selected thickness which is applied to the surface of the threads of a tubular to be mated with another joint of tubular. The plastic contains particles at a selected loading such that the particles support load between the mated threaded joints. Metal is removed from the mating threads, the thickness of the metal removed being about the same as the thickness of the plastic coating. The coating may be applied to the pin end or the box end of connections. The box end may be a coupling or an integral threaded area. The insulative threaded connection is used in tubulars for improved transmission of electromagnetic signals to or from wells.

12 Claims, 3 Drawing Sheets

FIG.1
FIG.3
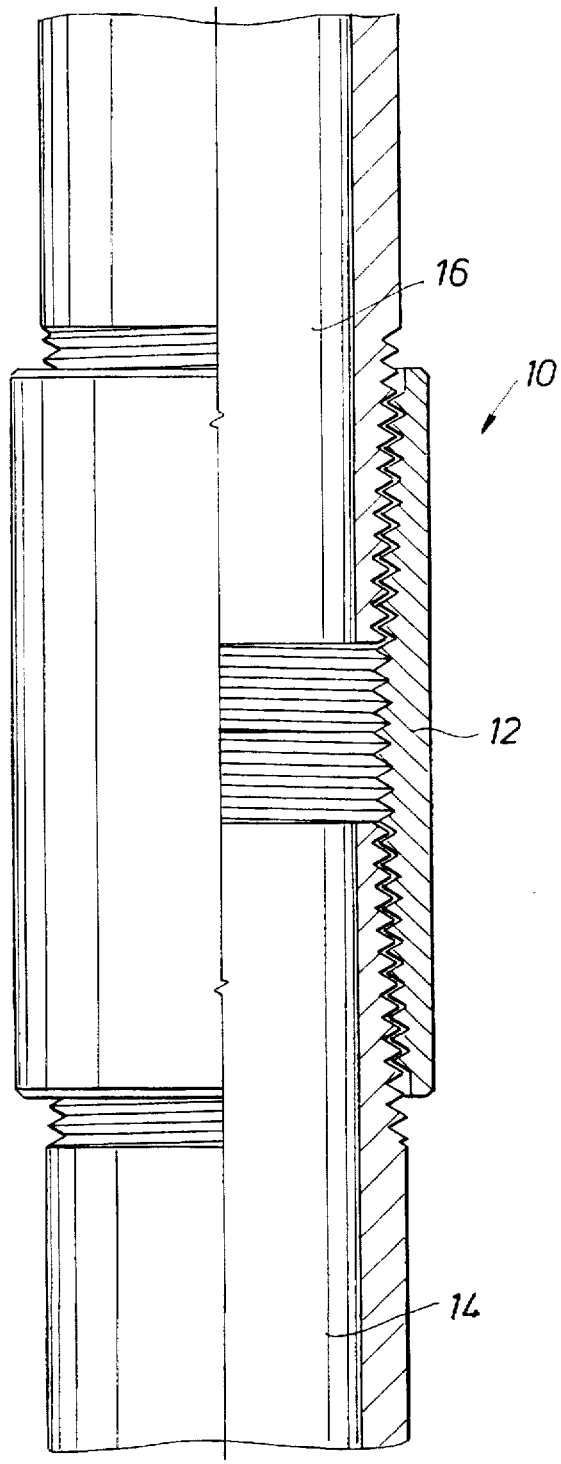
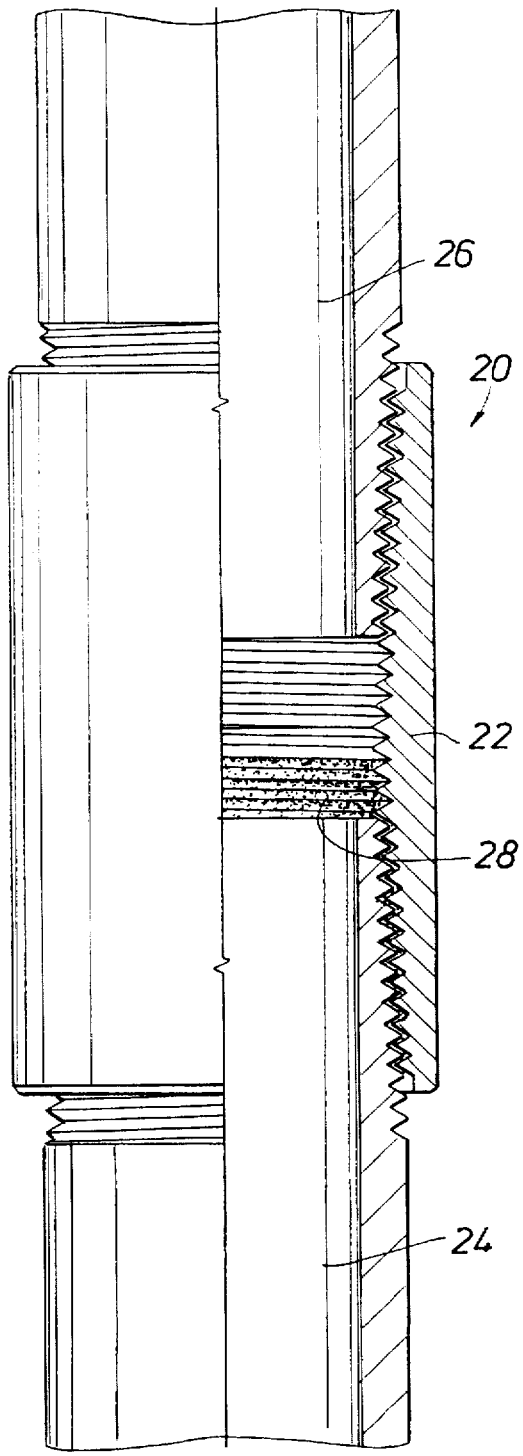

ELECTRICALLY INSULATIVE THREADED CONNECTION

SPECIFICATION

1. Field of the Invention

This invention pertains to threaded connections in piping or tubulars. More particularly, threaded connections made electrically insulative by a coating of plastic, the plastic containing insulative particles to prevent metal-to-metal contact of the thread surfaces, are provided.

2. Background of the Invention

Wells are normally drilled with a bit on the end of a tubular string called a "drill string." After the well is drilled to a selected depth, casing is placed in the well. The casing is cemented in place and serves to stabilize the wellbore to prevent its collapse and to allow sealing the wellbore with the cement. Usually, multiple strings of casing will be placed in the well over different depth intervals. Finally, a string of tubing, which serves to conduct fluid through the well, is placed inside the casing. "Joints" of drill pipe, casing and tubing are joined by threaded connections to form the strings of tubulars. The metal-to-metal contacts in the threaded connections between joints of the tubulars in a drill string, a casing string or a tubing string normally result in the electrical resistance of the connection being essentially that of the metal.

In recent years a variety of techniques have been developed for making physical measurements in wells during drilling of the well and communicating the measured data to the surface of the earth. One method for communicating data employs electromagnetic wave propagation through the earth. Any use of electrical or electromagnetic communication during drilling of wells is greatly affected by the presence of the electrically conducting drill string. During development of the electromagnetic wave communication systems for drilling wells, it became apparent that the systems would be more effective if it were possible to electrically isolate certain segments of the drill string from the remainder of the drill string. Such electrically insulating segments are described in U.S. Pat. No. 4,496,174. Also, U.S. Pat. No. 4,739,325 describes electrically insulated "gaps" in a drill string which are used to impose or sense an alternating voltage across the gap which is used to create an electromagnetic wave. These measurement-while-drilling systems communicate the data from an "open hole," or an uncased segment of a well.

U.S. Pat. No. 5,138,313 teaches an insulative gap sub for inclusion in a drill or tubing string to provide an insulative gap across which electrical signals may be developed for radiation to surface detecting equipment. Multiple metallic components of the gap sub are separated by a high performance plastic. Means are provided to transmit torque through the gap sub.

U.S. Pat. No. 5,163,714 discloses an electrically non-conducting segment which can be used in a drill string to provide an antenna for downhole transmission of data. Tapered tubular elements of gradually increasing or decreasing diameter are bonded together by a non-conducting epoxy resin.

Applications of data transmission from wells which have been cased are varied and numerous. For example, there is a need to monitor conditions inside the casing during treatments of wells by hydraulic fracturing, acidizing and other stimulation processes. There is a need to monitor pressure during production of wells and during pressure build-up or drawdown tests of wells. Sensors may be placed in wells for temperature, salinity or other measurements. Control signals may also be transmitted from the surface to change the state of valves or other devices downhole.

Transmission of data from cased wells by propagating electromagnetic waves through the earth is known. Systems are disclosed in U.S. patent application Ser. No. 08/071,797 and in U.S. Pat. No. 5,394,141. A battery-powered transmitter includes two electrical contacts spaced along the inside wall of the casing. A dipole antenna is then created as coded electrical signals are applied through the contacts to the casing. Alternatively, the antenna can be in the form of a toroid, which acts to produce electromagnetic waves. Electrically insulative or increased resistance connections in the string of casing between the contacts are disclosed. Similarly, transmission of waves by electrical contacts with the inside wall of tubing or a work string is known. Such transmission may be increased in strength by increasing the electrical resistance of a segment of the tubular string between the contacts transmitting the signal to the inside wall of the tubular.

In considering the structure and method of forming threaded connections having an increased electrical resistance, one must take into account the fact that many different forms of threaded connections are used in wells and other pipe strings and that each connection has certain strength requirements. Procedures for using each type of connection are well established. Different forms of threaded connections are often used for drill pipe, casing and tubing in a well and line pipe, used to form a pipeline.

Threads are machined onto the ends of the tubular joints so that the joint can be matingly connected to a coupling or another joint of tubular. A joint of tubular and a coupling or another joint form a threaded connection. The threaded connection is designed to hold the joints together under expected axial stresses and to provide a hydrostatic seal under expected pressure and stress loads. A variety of sealing mechanisms have been proposed for tubulars to be used in wells, but by far the most commonly used sealing method is that in the American Petroleum Institute (API) standard connection. The API publishes a number of specifications, standards and recommendations containing the minimal requirements that should be followed in the manufacture and use of oil well connections having the API-design. There are also many non-API tubular connections, designed by different manufacturers and outside the scope of API specifications, commonly referred to as "proprietary" connections.

FIG. 1 shows API connection 10 such as is commonly used in tubing and casing. Coupling 12 is adapted to receive threaded joints of pipe 14 and 16. Threads of the coupling and the pipe are tapered. In this type connection, the sealing mechanism is the bearing pressure between the coupling (sometimes called the "box") and the end of the pipe joint, sometimes called the "pin", as torque is applied to screw the joint into the coupling. The further the pin is screwed into the box, the greater the interference and the greater the bearing pressure produced. The bearing pressure, caused by the contact between the pin and the box thread flanks, is the sealing mechanism. The amount of bearing pressure is determined by how much the connection is "made up." The bearing pressure is also affected by internal pressures within the tubular. The maximum sealable internal pressure is affected by the bearing pressure from make-up. With the high bearing pressure, the electrical resistance across the connection will be essentially that of the metal.

FIG. 2 shows three common thread profiles used on the threaded connections of oil field casing and tubing. FIG.

2(a) shows the common API round thread profile. Coupling 12 of FIG. 1 is shown above the pin end of pipe 14. FIG. 2(b) shows another API thread form—the buttress thread, with box 12 and pin 14.

In FIG. 2(c) a non-API thread profile in box 12 and pin 14 is shown, called a "hook type" thread profile. The negative load flank angle, shown here as 10°, increases the strength of such threaded connection under tensile load.

There are a variety of other types of thread profiles and connections. This includes external and internal upset connections for tubing and casing and connections which do not depend for sealing upon a tapered thread but upon a shoulder or tapered surface having a metal-to-metal seal. The common drill pipe connection is sealed by a shoulder creating a metal-to-metal seal, as is the integral joint tubing or casing connection.

To prevent fluid leakage through the threads of connections, four sealing mechanisms are utilized: tapered thread interference fit (such as the API connection), metal-to-metal seals such as shoulder contacts, elastomers such as O-ring seals and thread compounds. All tubular connections use one or a combination of the four mechanisms.

The sealing mechanism of metal-to-metal shoulder seals is similar to the tapered connection, in that two smooth metal surfaces mate during makeup to produce a bearing pressure. Metal-to-metal seals in proprietary connections or drill pipe connections are usually placed at the beginning or end of the thread length. Many of the manufacturers of tubulars having metal-to-metal seals use a plastic or elastomeric ring as additional sealing protection. Some connections employ the seal ring at the end of the pin against an internal shoulder. Other connections have the seal ring placed in a machined groove in the thread profile. The elastomeric or plastic material will normally be an electrical insulator, but the electrical resistance of the connection is electrically "shorted" by the thread areas or other metal-to-metal sealing areas in contact.

"Thread compounds" are used to seal the gaps between thread surfaces and to lubricate the threads during make-up. Some thread compounds are composed of very finely divided ductile metal particles dispersed in a grease. Another thread compound is a resin which sets after the connection is made-up, to form a permanent connection which is sealed.

Makeup of tubular connections is a very important part of the procedure of using the tubulars. Torque is applied by special tongs. Loss of pressure integrity or failure of a string of tubulars can be caused by improper makeup. Normally, threads are protected with slip-over caps before the pipe is used and as it is brought to the well, then threads are cleaned and a thread compound is applied. The torque required to make up the connection is usually measured with the tong used for the makeup. A range of makeup torque values is prescribed for all API connections and each non-API manufacturer provides recommended conditions for making-up their connections. Either over-makeup or under-makeup can cause problems such as insufficient joint strength, leaking and overstressing. The API recommends that the API connection should be made up approximately two turns beyond a hand tight position. This will normally be sufficient to build up the recommended range of torque values. Methods are available for measuring the distance a pipe is screwed into a connector, as well as the torque. This "torque turn" method is recommended for API connections. Other manufacturers of non-API connections have recommendations which apply to each of their proprietary connections.

It is apparent that the electrical resistance of threaded tubular connections normally used in tubular strings in wells or other applications will be very low or essentially that of the metal. The means for obtaining electrically resistive connections in tubulars have heretofore required construction of special apparatus to be incorporated into the string of tubulars. There is a need for an electrically insulative threaded connection that is inexpensive and that can be readily incorporated into a string of tubulars using the same connections as present in the tubular string. The connection should be available in a variety of thread profiles, with API or non-API design. It should require minimal extra equipment at a well site or other usage site. It should be suitable for permanent installation in casing strings as they are placed in a well or for temporary installation in strings such as drill strings and tubing strings or other pipe lines or strings.

SUMMARY OF THE INVENTION

Threaded connections having electrically insulative properties are provided. The sealing mechanism of the connection may be entirely by tapered threads (API), by proprietary thread profiles or by threads and a metal-to-metal seal on a shoulder. Metal-to-metal contact in threads is prevented by removing a selected thickness of metal from one of the mated thread areas and replacing the metal with a mixture of a plastic with solid particles embedded within the plastic. The plastic and particle film may be applied to the same thread area from which the metal is removed or may be applied to the mated thread area. A variety of insulative materials may be used to insulate shouldered contacts. An area of metal not within threads may be covered with plastic, using techniques known in industry. Such insulated tubular connections may be formed in casing, tubing, drill string or other threaded connection for tubulars.

BRIEF DESCRIPTION OF THE DRAWINGS

FIG. 1 shows coupling and joints of a standard API connection for tubulars.

FIG. 3 shows the standard API connection of FIG. 1 with the coating of this invention on the coupling.

DETAILED DESCRIPTION OF PREFERRED EMBODIMENT

Figure 2A:
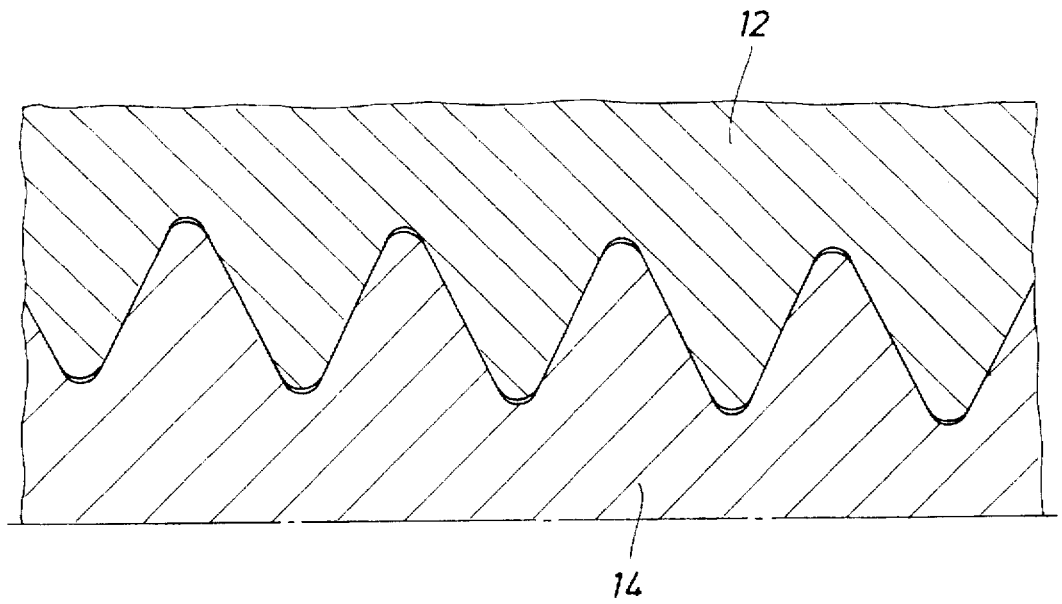
FIGS. 2(a–c) shows example thread profiles used with casing and tubing.

Referring to FIG. 3, electrically insulative coupling 20 according to one embodiment of this invention is shown. A cut-away view of coupling 22 shows the threaded end of two joints, 24 and 26. The surface of the threads of coupling 22 has been coated with a selected thickness of a plastic coating 28, the plastic containing a selected concentration of high-strength, insulative particles. The particles are preferably ceramic and round or having a smooth surface. The thickness of the coating is generally in the range from about 0.020 inch to about 0.080 inch, but may be greater or smaller depending on the conditions of usage of the tubular connection. If non-insulative connections are being experienced, and the strength of the coupling is not a major limitation, a thicker coating may be applied. The preferred thickness is also dependent on the size of the coupling. For 5 ½ inch casing where maximum tensile force on the casing and pressure in the casing is not high, a thickness of about 0.050 inch is suitable. For 4 ½ inch casing, the thickness may be reduced to about 0.030 inch. The thickness of coating containing particles may be decreased when the tubular is to be used in deeper and higher pressure wells if thread jumpout from tensile load or thread leakage poses higher risk. Selection of thread profile may minimize such risks and allow greater thickness of coatings to be applied.

The plastic used in the coating may be in the form of a liquid resin which is later polymerized to form a thermoset plastic. Alternatively, the plastic may be a thermoplastic which is brought to a high temperature sufficient for application. In either case, however, the plastic is to contain solid particles. The solid particles have a diameter less than the thickness of the metal removed from the coupling, and preferably less than about 40 per cent of the thickness of the metal removed. In one embodiment, the particles have a diameter from about 5 micrometers to about 100 micrometers. Alternatively, the particles may be sized to be more uniform in diameter. A liquid resin solution may be used which has a viscosity suitable for spraying on the thread area. The resin may be an epoxy containing suitable hardener or catalyst and, if desired, a solvent. A preferred material is sold as IMPREGLON™ 26X, which is an epoxy solution loaded with ceramic particles. It is available from SR Metal Protection, Ltd. of Edmonton, Alberta, Canada. The resin solution is sprayed on the thread area to produce a thickness estimated to be the desired thickness after any solvent in the solution has evaporated. The loading of the solid particles is preferably high enough such that the concentration of particles between metal surfaces will be sufficient to support a substantial portion of the force causing metal-to-metal contacts to form in the threads. When connections having higher bearing or interference pressure are to be made insulative, it is preferable that the particles have high strength to resist crushing under the bearing pressure in the threads. The remaining force preventing metal-to-metal contact is supplied by the plastic matrix.

The plastic coating will preferably be sprayed onto the metal surface after the surface has been cleaned and properly prepared so as to promote adhesion of the plastic. The coating may be sprayed in multiple steps, allowing curing between each step. A pin gage may be made up, using a plastic or other material, having the size of the pin to be prepared for insertion into the coated area of the connector. Between application of each layer of coating, the pin gage may be screwed into the connector. The thickness of the coating should be increased to the value such that the pin gage screws into the connector hand tight to the position recommended for the connector. For example, for API connections, it is recommended that two to four threads be outside the connector when hand-tight. If a coating thickness of 0.050 inch is selected, a pin gage is made up having API threads decreased in diameter by 0.050 inch. The pin gage is used to determine when the coating has reached the selected thickness.

After the selected thickness of coating is applied to the threaded area of a coupling, the threaded area of a tube to matingly join the coupling is cut to decrease the diameter of the threads by substantially an amount equal to the thickness of the coating applied. The threads may be cut by machinery normally used for cutting the threads. The thread profile is substantially the same but the diameter of the threads is decreased by the selected thickness of the coating on the mating threads.

Figure 2B:
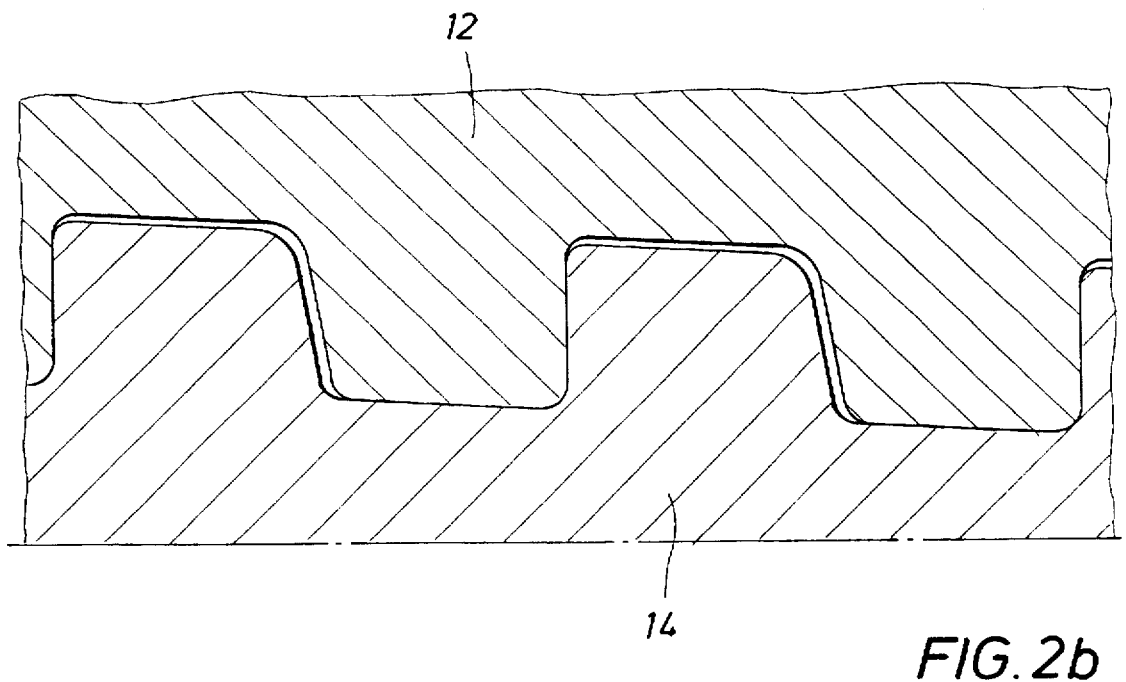
Figure 2C:
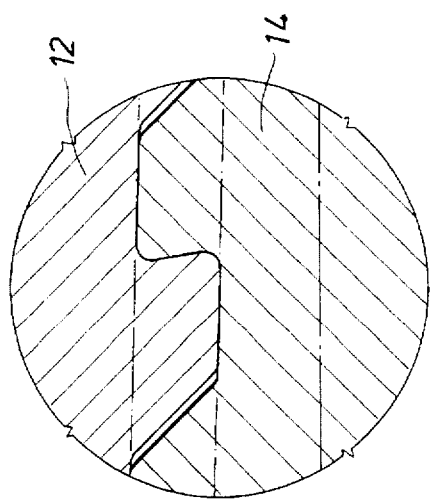

For other thread profiles, such as those shown in FIGS. 2(b) and 2(c), drill pipe or other proprietary connections, the coating may be applied to the coupling or to the box end of another joint when integral connections are used. A uniform thickness of coating will usually be applied over the thread surface and any other metal-to-metal seal surfaces of the connection. However, it is also contemplated that thicker coatings may be applied over some surfaces of a connection. For example, a thicker coating may be applied over a shoulder or tapered metal-to-metal seal area than over the threads. Some areas of a thread profile, such as a buttress thread shown in FIG. 2(b), may be sprayed with an extra coating to achieve greater thickness and decrease the chance of low electrical resistance when the connection is made-up.

After the thread area is coated with plastic containing particles and the plastic is hardened, the coupling may be made-up on a joint of pipe in a shop or may be taken to the site where it will be used. If the connection is to be a permanent installation, such as in casing of a well, pipe 24 (FIG. 3) may be joined to coupling 22, in the shop. A thread compound can then be used to insure a pressure seal of the connection and to prevent its being loosened while running casing in a well. It was found that a second coat of plastic, which is a liquid solution of epoxy resin, applied to the thread area before the connection is made up allows good hydraulic seal of the connection. Use of such plastics as thread compounds is well-known in industry. One such product is BAKER BOND™, sold by Baker Hughes, Inc.

Figure 4:
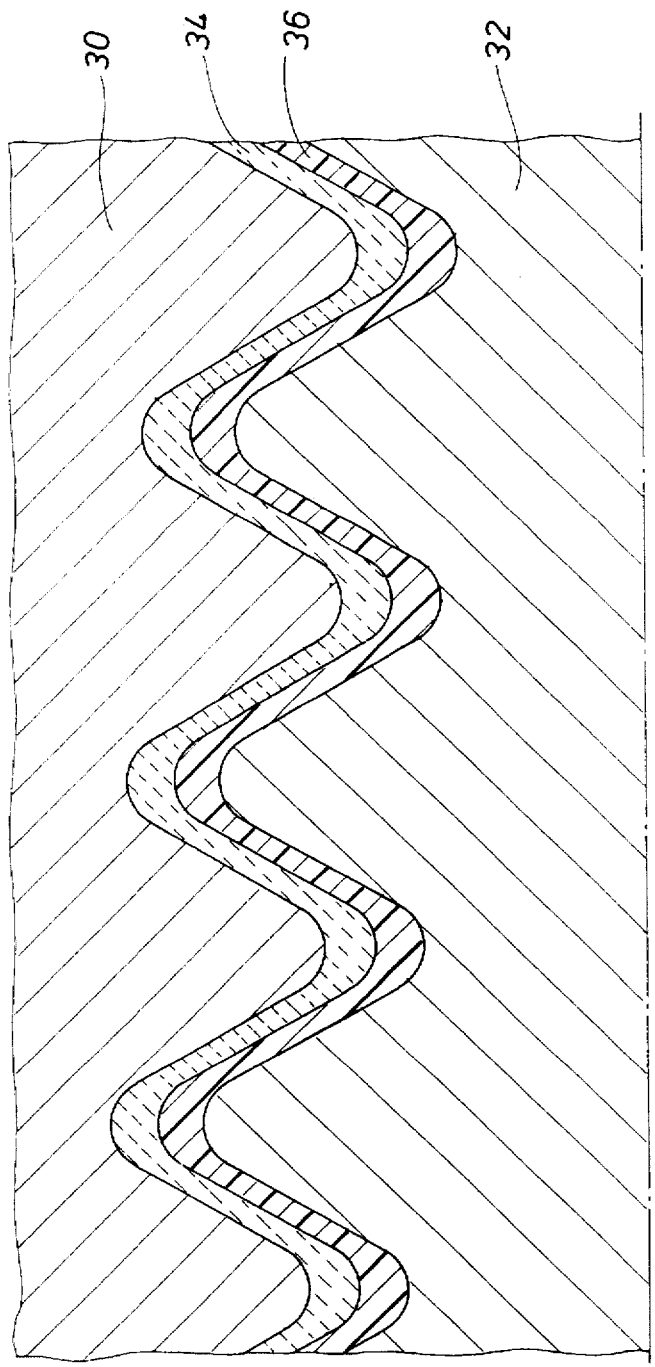
FIG. 4 shows a profile of threads having a coating of plastic containing particles and a coating of plastic without particles according to one embodiment of the present invention.

Referring to FIG. 4, details of an API round thread profile are shown. Coupling 30 and pin end 32 form a connection of this invention. Layer 34 is the coating which has been applied to coupling 30 and described above, which may be epoxy containing ceramic particles. After layer 34 has been applied and cured and the threads of pin 32 have been cut to decrease diameter, liquid epoxy resin has been applied to the box or pin and the connection has been made up as recommended for such connection. The resin used as thread compound has then cured to form layer 36.

Makeup of connections having the insulative coating of this invention uses normal practices. The torque applied may be in the range of that recommended for that connection.

Although the coating of the surface of the threads of couplings and the removal of a corresponding thickness of metal from the tube or pin has been described heretofore, it should be understood that the threads of the pin or tube may have a selected thickness of plastic-containing-particle coating applied and the coupling may have a corresponding thickness of metal removed. Also, it is within the apparatus and method of this invention to apply the coating of plastic-containing-particles to the same surface from which metal has been removed. Any combination of metal removal and coating application may be used. For shoulders or other metal-to-metal seals in some types of connections, it may not be necessary to remove a thickness of metal corresponding to the thickness of the coating of particle-containing plastic applied to the mating surface. The critical requirement is that the particle-containing plastic coating be applied to prevent metal-to-metal contact in the connection.

It may be desirable in some applications of the insulative tubular threaded connection of this invention to combine the coating of a threaded area with the coating of adjacent metal surface, such as the total inside and outside surface of a connector, of a pup joint, or of a full joint of tubing or casing or line pipe. In this way, if the tubular is in contact with a conductive solution in a well or adjacent the outside surface of the tubular, it will be possible to extend the distance between metal surfaces open to wellbore or other fluids. This may allow higher resistances between adjacent segments of the pipe string. This higher resistance may allow transmission of even stronger signals from downhole transmitters depending on formation of a dipole antenna in a tubular in the wellbore or may allow receiving of weaker signals from the surface.

The plastic coating of the interior surfaces of tubing for use in wells is a well developed technology. Such coatings are available, for example, from Tuboscope Vetco International of Houston, Tex. Such coating may also be formed from epoxy resin such as described above. It is not necessary that the plastic contain particles when applied to surfaces other than the threaded surfaces or metal-to-metal seal surfaces, but the same solution may be used if desired over the entire surfaces of the tubular.

EXAMPLE 1

The API 8-round threads in one end of a coupling for 5 ½ inch casing were cleaned and coated with IMPREGLON™ 26X. The pin end of a joint of 5 ½ inch casing was overcut by about 0.050 inch. A coating of BAKER BOND™ was applied to the surfaces and the joint and the coated end of the coupling were made-up. The assembly was then taken to a well in the Hugoton Basin in Kansas. During running of the production casing in the well, the insulative connection was placed in the casing string so as to be at a depth of about 3500 feet when the casing was cemented in the well. The well was then completed and a hydraulic fracturing treatment of the well was begun. It was desired to measure bottom-hole pressure in the well during the fracturing treatment to facilitate analysis of the treatment. A TAS™ tool for transmitting electromagnetic signals to the surface from a well was placed in the well. The tool employed two spaced-apart electrodes which contacted the casing. When the tool was placed at about 3500 feet but with the electrodes not across the insulative joint in the casing, signals transmitting pressure data were received at the surface, after amplification, at a level of about 150 millivolts. The TAS™ tool (available from Real Time Diagnostics, Inc. of Houston, Tex.) was then moved such that the electrodes contacted the casing wall on opposite sides of the insulative connection. At the same amplification, the signal received immediately increased to about 5 volts, or about 33-fold. This increase in signal strength allowed successful recording of all bottom-hole pressure data during the fracturing treatment, even though a noise level of about 1 volt often occurred during the pumping of fluid.

EXAMPLE 2

A similar procedure was followed as in Example 1. The well was in the same field and the transmission was from about the same depth. When the TAS™ tool was placed across the insulative connection, the signal increased from about 150 millivolts to about 2 volts, or about 13-fold. This increase in signal strength, with a noise level again of around 1 volt, allowed recovery of pressure data during a hydraulic fracturing treatment.

EXAMPLE 3

The threads in the box end of a drill collar are increased in diameter by 0.050 inch. A coating of epoxy containing ceramic particles is then sprayed on the threads and on the shoulder seal of the collar to a thickness of about 0.050 inch. The collar having the coating is placed in a drill string at a depth where a TAS™ tool is to be used to transmit data during a drilling operation. When the electrodes from the tool are placed across the insulative coupling, the signal strength from the tool, as measured at the surface of the earth, increases to a value allowing collection of the desired data.

Other variations and embodiments of the invention will be recognized by one skilled in the art, and it is intended that the invention be limited only as set forth within the claims appended hereto.

What is claimed is:

1. An electrically insulative threaded connection, comprising:
   a tubular joint having a threaded pin end;
   a box having threads therein, the threads of the box being adapted to receive the threads of the tubular joint matingly; and
   an electrically insulative coating therebetween, the coating having a selected thickness and comprising insulative plastic having dispersed therein insulative particles, the particles having a maximum dimension less than the selected thickness.

2. The threaded connection of claim 1 wherein the selected thickness of the insulative coating is from about 0.020 inch to about 0.080 inch.

3. The threaded connection of claim 1 wherein the plastic is an epoxy.

4. The threaded connection of claim 1 wherein the particles are ceramic.

5. The threaded connection of claim 1 wherein the particles have a diameter from about 5 micrometers to about 100 micrometers.

6. The threaded connection of claim 1 wherein the threads of the box end are coated to the selected thickness and the threads of the pin end are overcut by about the same amount as the thickness of the coating.

7. The threaded connection of claim 1 wherein the threads of the pin end are coated and the threads of the box end are overcut by about the same amount as the thickness of the coating.

8. The threaded connection of claim 1 additionally comprising a thread compound in juxtaposition with the coating.

9. An electrically insulative threaded connection, comprising:
   a tubular joint having a threaded pin end;
   a box having threads therein, the threads of the box being adapted to receive the threads of the tubular joint matingly;
   an area for metal-to-metal sealing between the tubular joint and the box, and
   an electrically insulative coating between the threads and the area for metal-to-metal sealing, the coating having a selected thickness and comprising insulative plastic having dispersed therein insulative particles, the particles having a maximum dimension less than the selected thickness.

10. The threaded connection of claim 9 wherein the threads of the box end are coated to the selected thickness and the threads of the pin end are overcut by about the same amount as the thickness of the coating.

11. The threaded connection of claim 9 wherein the plastic is an epoxy.

12. The threaded connection of claim 9 wherein the particles are ceramic.

* * * * *